United States Patent
Shen

(10) Patent No.: US 12,265,238 B2
(45) Date of Patent: Apr. 1, 2025

(54) SUN PROTECTION DEVICE HAVING PLURALITY OF VOIDS AND S-TYPE POLARIZER

(71) Applicant: PRIMAX ELECTRONICS LTD., Taipei (TW)

(72) Inventor: Wei-Ting Shen, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 548 days.

(21) Appl. No.: 17/809,282

(22) Filed: Jun. 28, 2022

(65) Prior Publication Data
US 2023/0367043 A1 Nov. 16, 2023

(30) Foreign Application Priority Data
May 12, 2022 (TW) .................. 111117894

(51) Int. Cl.
*A47F 3/00* (2006.01)
*F21V 9/14* (2006.01)
*G02B 5/02* (2006.01)
*G02B 5/30* (2006.01)
*G02B 27/28* (2006.01)

(52) U.S. Cl.
CPC ......... *G02B 5/0247* (2013.01); *G02B 5/0284* (2013.01); *G02B 27/281* (2013.01); *A47F 3/002* (2013.01); *F21V 9/14* (2013.01); *G02B 5/30* (2013.01)

(58) Field of Classification Search
CPC ......... A47F 3/002; F21V 9/14; G02B 5/0247; G02B 5/0284; G02B 27/281; G02B 2207/107

See application file for complete search history.

(56) References Cited

U.S. PATENT DOCUMENTS

2007/0134438 A1* 6/2007 Fabick .................. G02B 5/0247 428/1.1

* cited by examiner

*Primary Examiner* — Ryan S Dunning
(74) *Attorney, Agent, or Firm* — WPAT, PC

(57) ABSTRACT

A sun protection device is provided, which includes a main body and an S-type polarizer. The main body has an outer surface and an inner surface opposite to each other, and the outer surface is configured to face sunlight, and the main body has a plurality of voids disposed inside the main body, on the inner surface of the main body or a combination thereof, in which when the sunlight irradiates the outer surface of the main body, a first reflected light and a first refracted light are formed, and the first refracted light enters the main body, and when the first refracted light arrives at a surface of one of the voids facing the outer surface, a second reflected light is formed. The S-type polarizer is adjacent to the inner surface of the main body.

11 Claims, 5 Drawing Sheets

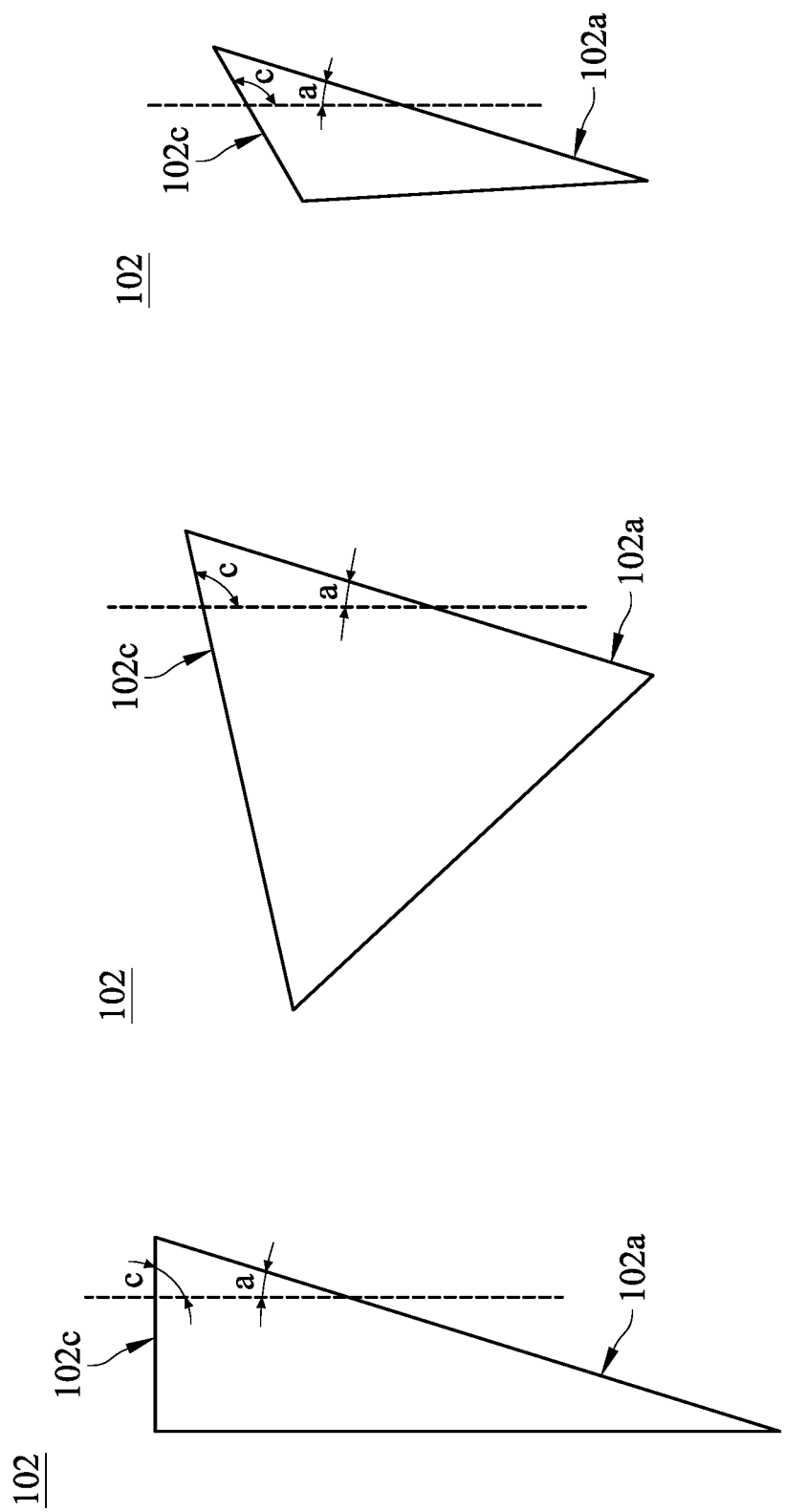

SUN PROTECTION DEVICE HAVING PLURALITY OF VOIDS AND S-TYPE POLARIZER

FIELD OF THE INVENTION

The present disclosure relates to a sun protection device, in particular, to a sun protection device including a main body with a plurality of voids and an S-type polarizer.

BACKGROUND OF THE INVENTION

Since outdoor products (e.g., electronic locks, doorbells, water meters, cars, or monitors) have the risk of overheating internal electronic components due to sunlight, there is a need for a product that can effectively protect the electronic components from the sunlight. Currently commercially available sun protection products include fans, metal radiators, non-metallic thermal insulation papers, metal thermal insulation papers and sunshades, and each of which has its own shortcomings. For example, the fan needs to be connected to a power source and will make noise during operation; the metal radiator is larger and heavier; the non-metallic thermal insulation paper has poor sunlight reflection ability; the metal thermal insulation paper has external reflection issues; the sunshade requires some additional components. Therefore, there is a need for a new sun protection product.

SUMMARY OF THE INVENTION

The present disclosure provides a sun protection device, which includes a main body and an S-type polarizer. The main body has an outer surface and an inner surface opposite to each other, and the outer surface is configured to face sunlight, and the main body has a plurality of voids disposed inside the main body, on the inner surface of the main body or a combination thereof, in which when the sunlight irradiates the outer surface of the main body, a first reflected light and a first refracted light are formed, and the first refracted light enters the main body, and when the first refracted light arrives at a surface of one of the voids facing the outer surface, a second reflected light is formed. The S-type polarizer is adjacent to the inner surface of the main body.

In some embodiments, the surface of the one of the voids facing the outer surface is configured to maintain or increase an incident angle of the first refracted light.

In some embodiments, the surface of the one of the voids facing the outer surface is configured to make an incident angle of the first refracted light greater than or equal to a Brewster's angle or a critical angle calculated from a refractive index of the main body and a refractive index of the void.

In some embodiments, an inner angle between the surface of the one of the voids facing the outer surface and a cross-section parallel to the outer surface is in a range of between 0° and 35°.

In some embodiments, an inner angle between another surface of the one of the voids connected to the surface and the cross-section parallel to the outer surface is greater than or equal to 90°.

In some embodiments, the one of the voids is disposed inside the main body, and a shape of a thickness section of the one of the voids perpendicular to the outer surface is a triangle, a quadrilateral or a truncated circle.

In some embodiments, the one of the voids is disposed on the inner surface of the main body, and has the surface facing the outer surface and another surface, and the other surface is connected between the surface and the inner surface.

In some embodiments, the sun protection device is positioned upright.

In some embodiments, the sun protection device further includes a thermal insulation material layer adjacent to the S-type polarizer, and the S-type polarizer is interposed between the main body and the thermal insulation material layer.

In some embodiments, the S-type polarizer and the thermal insulation material layer are separated from each other.

In some embodiments, the main body is made of polycarbonate (PC) or poly(methyl methacrylate) (PMMA).

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

FIGS. 5A to 5C are schematic cross-sectional views of triangular voids according to various embodiments of the present disclosure.

DETAIL DESCRIPTION OF THE PREFERRED EMBODIMENT

Figure 2:
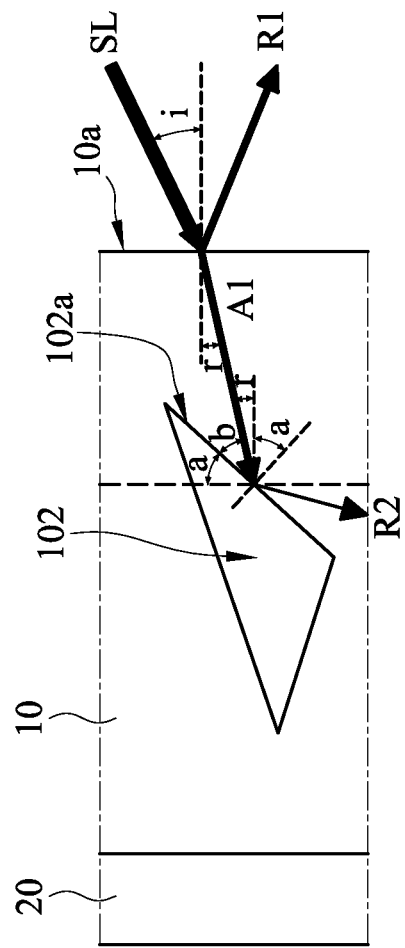
FIG. 2 is a partial enlarged schematic view of FIG. 1.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations.

For example, when the drawing is flipped up and down by 180°, the relationship between the one element and the other element may change from "beneath" to "over." The spatially relative descriptions used herein should be interpreted the same.

As mentioned in background of the invention, since outdoor products such as electronic locks, doorbells, water meters, cars or monitors have the risk of overheating internal electronic components due to sun exposure, there is a need for a product that can effectively protect the electronic components from the sunlight. However, commercially available sun protection products still have their disadvantages, so there is a need for a new sun protection product. Accordingly, the present disclosure provides a sun protection device which has an excellent reflection effect and does not have the disadvantages of the commercially available sun protection products. Various embodiments of the sun protection device of the present disclosure will be described in detail below.

Figure 1:
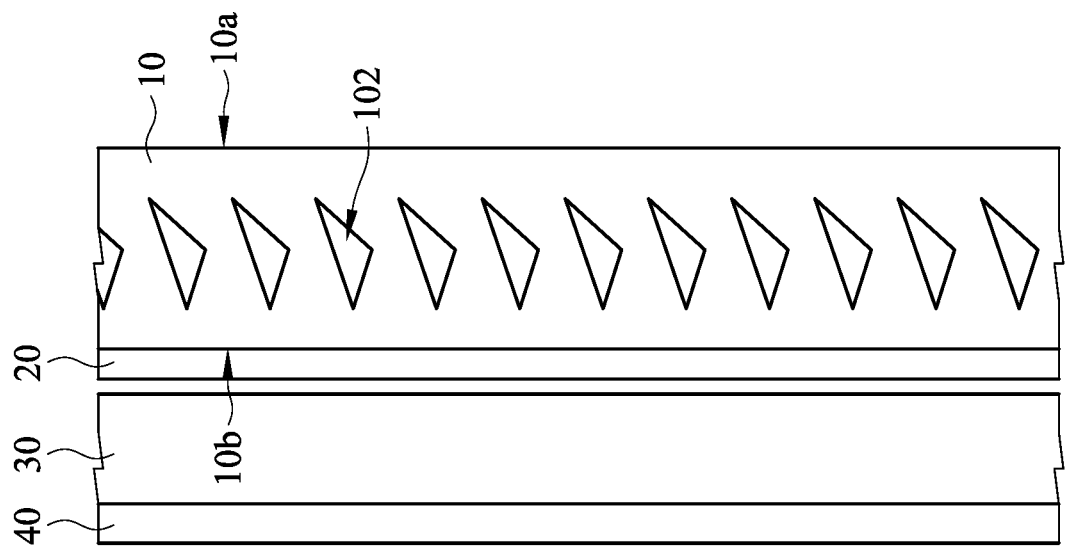
FIG. 1 is a schematic cross-sectional view of a sun protection device according to an embodiment of the present disclosure.

FIG. 1 is a schematic cross-sectional view of a sun protection device according to an embodiment of the present disclosure. As shown in FIG. 1, the sun protection device includes a main body 10 and an S-type polarizer 20. The main body 10 has an outer surface 10a and an inner surface 10b opposite to each other, and the outer surface 10a is configured to face sunlight. The main body 10 has a plurality of voids 102 disposed inside the main body 10. In some embodiments, the main body 10 is made of polycarbonate (PC), poly(methyl methacrylate) (PMMA) or other suitable plastic materials. In some embodiments, the main body 10 is flat or curved. In some embodiments, the interior of void 102 is air or other gas. The S-type polarizer 20 is adjacent to the inner surface 10b of the main body 10. In some embodiments, the S-type polarizer 20 is attached to the inner surface 10b through an adhesive layer (not shown) or in direct contact with the inner surface 10b. In some embodiments, the sun protection device is positioned upright, as shown in FIG. 1. However, the present disclosure is not limited to the foregoing embodiments, and arrangement of the sun protection device can be appropriately adjusted according to actual needs. For example, the sun protection device can be arranged horizontally or diagonally.

In some embodiments, as shown in FIG. 1, optionally, the sun protection device further includes a thermal insulation material layer 30 adjacent to the S-type polarizer 20, and the S-type polarizer 20 is interposed between the main body 10 and the thermal insulation material layer 30. In some embodiments, the S-type polarizer 20 and the thermal insulation material layer 30 are separated from each other, so as to prevent thermal energy absorbed by the S-type polarizer 20 from being directly conducted to the thermal insulation material layer 30. The present disclosure effectively reduces influence of solar thermal energy on an electronic device 40 by arranging the main body 10 with the voids 102, the S-type polarizer 20 and the thermal insulation material layer 30.

It should be noted that FIG. 1 shows a cross-sectional shape of the void 102 in a height direction and a thickness direction, and a shape of the void 102 in a width direction can be designed according to actual needs. For example, one of the voids 102 may be an elongated void extending along the width direction (not shown), or the voids 102 are spaced apart from each other along the width direction.

FIG. 2 is a partial enlarged schematic view of FIG. 1. As shown in FIG. 2, when the sunlight SL irradiates the outer surface 10a of the main body 10, a first reflected light R1 and a first refracted light A1 are formed, and the first refracted light A1 enters the main body 10. Next, when the first refracted light A1 arrives at a surface 102a of the void 102 facing the outer surface 10a, a second reflected light R2 is formed. When the first refracted light A1 arrives at the surface 102a of the void 102, a second refracted light (not shown) may also be formed.

A Brewster's angle (hereinafter referred to as a first Brewster's angle) can be calculated according to Brewster's law, a refractive index ($n1$) of air (i.e., the optically rarer medium) and a refractive index ($n2$) of the main body 10 (i.e., the optically dense medium). In one example, according to Brewster's law, the refractive index of air ($n1=1$) and the refractive index of the main body 10 ($n2=1.58$), the first Brewster's angle is calculated to be about 57.7°. Therefore, when an incident angle i of the sunlight SL is greater than or equal to about 57.7° (i.e., the first Brewster's angle), most or all of the first reflected light R1 is S-type polarized light, while most of the first refracted light A1 is P-type polarized light, and a small amount thereof is S-type polarized light. Since the P-type polarized light cannot pass through the S-type polarizer 20, the light penetrating the inner surface 10b of the main body 10 can be greatly reduced, and the thermal energy transmitted to the electronic element 40 can be reduced, thereby effectively preventing failure of the electronic element 40 from increasing in temperature due to accumulation of the thermal energy.

However, the incident angle i of the sunlight SL varies with time, so in some time periods, the incident angle i of the sunlight SL is smaller than the first Brewster's angle. Accordingly, the present disclosure increases reflectivity of the first refracted light A1 by providing the voids 102. Specifically, as shown in FIG. 2, after the first refracted light A1 enters the main body 10, it will arrive at the surface 102a of one the voids 102 facing the outer surface 10a. At this time, the second reflected light R2 can be formed to improve the light reflectivity. Two modeling designs of the void 102 for improving the light reflectivity are provided below.

The first design of the void 102 is related to a Brewster's angle. The Brewster's angle (hereinafter referred to as a second Brewster's angle) can be calculated according to Brewster's law, the refractive index ($n1$) of the main body 10 (i.e., the optically dense medium) and the refractive index ($n2$) of air (i.e., the optically rarer medium). In one example, according to Brewster's law, the refractive index of the main body 10 ($n1=1.58$) and the refractive index of air ($n2=1$), the second Brewster's angle is calculated to be about 32.3°. Therefore, when an incident angle of the first refracted light A1 is greater than or equal to about 32.3° (i.e., the second Brewster's angle), most or all of the second reflected light R2 is S-type polarized light, while most of the second refracted light is P-type polarized light, and a small amount thereof is S-type polarized light. Since the P-type polarized light cannot pass through the S-type polarizer 20, the light penetrating the inner surface 10b of the main body 10 can be greatly reduced, and the thermal energy transmitted to the electronic element 40 can be reduced, thereby effectively preventing failure of the electronic element 40 from increasing in temperature due to accumulation of the thermal energy.

The second design of the void 102 is related to a critical angle. The critical angle can be calculated according to a critical angle formula, the refractive index ($n1$) of the main body 10 (i.e., the optically dense medium) and the refractive index ($n2$) of air (i.e., the optically rarer medium). In an example, according to the critical angle formula, the refractive index of the main body 10 ($n1=1.58$) and the refractive index of air ($n2=1$), the critical angle is calculated to be about 39.3°. Therefore, when an incident angle of the first refracted light A1 is greater than or equal to about 39.3° (i.e., the critical angle), total reflection occurs, so the light penetrating the inner surface 10b of the main body 10 can be greatly reduced, and the thermal energy transmitted to the electronic component 40 can be reduced, thereby effectively preventing failure of the electronic element 40 from increasing in temperature due to accumulation of the thermal energy.

It should be noted that the incident angle of the first refracted light A1 is related to an inclination angle of the surface 102a of the void 102. The surface 102a of the void 102 is configured to maintain or increase the incident angle of the first refracted light A1. The surface 102a of the void 102 is configured to make the incident angle of the first refracted light A1 greater than or equal to the Brewster's angle or the critical angle calculated from the refractive index of the main body 10 and the refractive index of the void 102. Referring to FIG. 2, if an inner angle a between the surface 102a of the void 102 and a cross-section parallel to the outer surface 10a (i.e., the dotted line in FIG. 2) is larger, the incident angle of the first refracted light A1 is larger. As shown in FIG. 2, sum of the inner angle a, an angle b and a refraction angle r is 90°, and the incident angle of the first refracted light A1 is sum of the inner angle a and the refraction angle r. Therefore, the present disclosure can maintain or increase the incident angle of the first refracted light A1 by controlling the inner angle a. In some embodiments, the inner angle a between the surface 102a of one of the voids 102 and the cross-section parallel to the outer surface 10a is greater than or equal to 0°. In some embodiments, the inner angle a is in a range of between 0° and 35°. In some embodiments, the inner angle a is in a range of between 0° and 15°.

In an example, according to a formula of reflectance ratio of the S-type wave (Rs) and a formula of reflectance ratio of the P-type wave (Rp), when the incident angle i of the sunlight SL is 30°, reflectivity of the main body 10 having the void 102 with the inner angle a of 15° is about 3 times reflectivity of a main body without any void. In one example, when the incident angle i of the sunlight SL is 60°, reflectivity of the main body 10 having the void 102 with the inner angle a of 0° is about twice reflectivity of a main body without any void.

However, a numerical range of the inner angle a is not limited to the foregoing embodiments. In practical applications, the value of the inner angle a can be calculated based on one or more values or numerical ranges of the incident angle i of the sunlight SL that the sun protection device is expected to resist, the refractive index of the main body 10 and the refractive index of the void 102 to obtain optimized one or more inner angles a.

For example, assume that the incident angle i of the sunlight SL that the sun protection device is expected to resist is in a range of from 30° to 55° (less than the calculated first Brewster's angle): in the case where the incident angle i is 30°, an inner angle a1 can be designed to be more than or equal to 14°, so that the incident angle of the first refracted light A1 (i.e., sum of the inner angle a1 and a refraction angle r) is greater than or equal to a calculated second Brewster's angle; in the case where the incident angle i is 55°, an inner angle a2 can be designed to be more than or equal to 1.5°, so that the incident angle of the first refracted light A1 (i.e., sum of the inner angle a2 and a refraction angle r) is greater than or equal to a calculated second Brewster's angle. Accordingly, two kinds of voids with different inner angles a1, a2 may be used to dispose in the main body.

Figure 3:
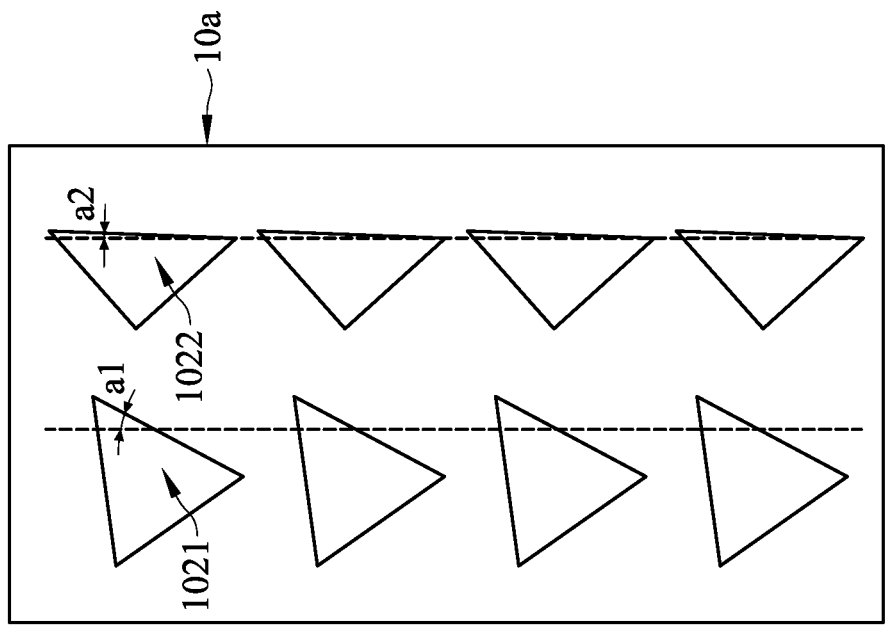
FIG. 3 is a schematic cross-sectional view of a sun protection device according to an embodiment of the present disclosure.
Figure 4:
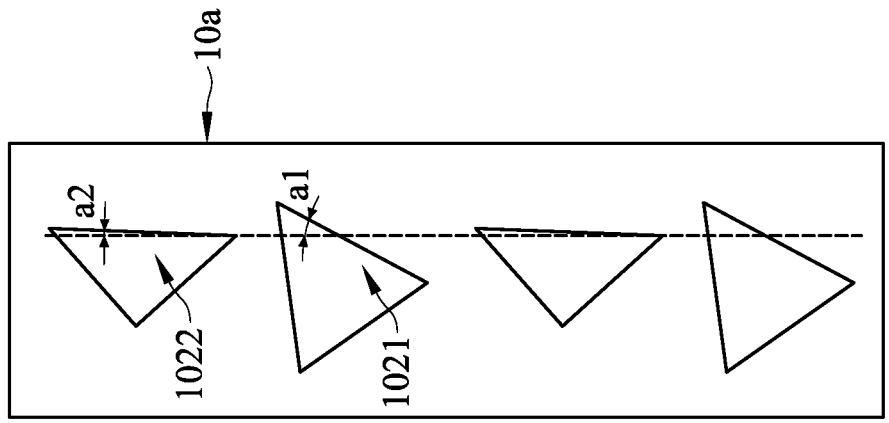
FIG. 4 is a schematic cross-sectional view of a sun protection device according to an embodiment of the present disclosure.

FIG. 3 is a schematic cross-sectional view of a sun protection device according to an embodiment of the present disclosure. As shown in FIG. 3, two kinds of voids 1021 and 1022 with different inner angles a1 and a2 can be arranged in two columns. FIG. 4 is a schematic cross-sectional view of a sun protection device according to an embodiment of the present disclosure. As shown in FIG. 4, two kinds of voids 1021 and 1022 with different inner angles a1 and a2 can be arranged in a single column with staggered arrangement. However, the present disclosure is not limited to the above-mentioned embodiments, and in practical applications, setting positions, arrangement and number of the various voids can be appropriately adjusted according to actual needs. For example, the various voids with different inner angles can be designed according to an incident angle of the sunlight SL that the sun protection device is primary to resist and one or more incident angles of the sunlight SL that the sun protection device is secondary to resist, and number and arrangement positions of the various voids can be adjusted according to the primary and secondary relationships. For example, the number of the voids corresponding to the incident angle of the sunlight SL for the primary defense may be more and can be disposed closer to the outer surface 10a of the main body 10. However, it should be noted that the foregoing is only an example and is not intended to limit the present disclosure.

Figure 6C:
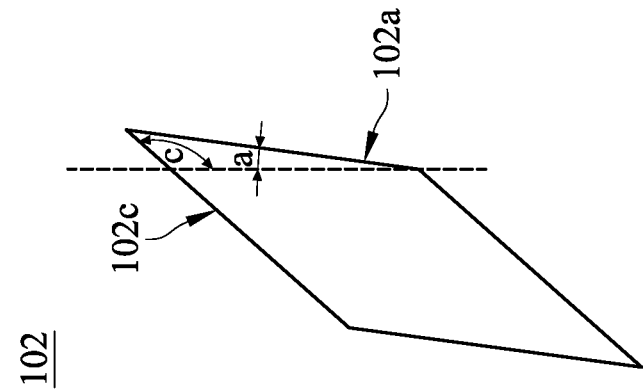
FIGS. 6A to 6C are schematic cross-sectional views of quadrilateral voids according to various embodiments of the present disclosure.
Figure 6B:
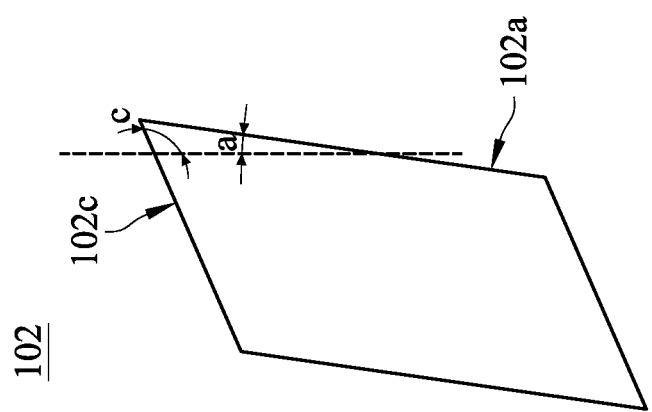
Figure 6A:
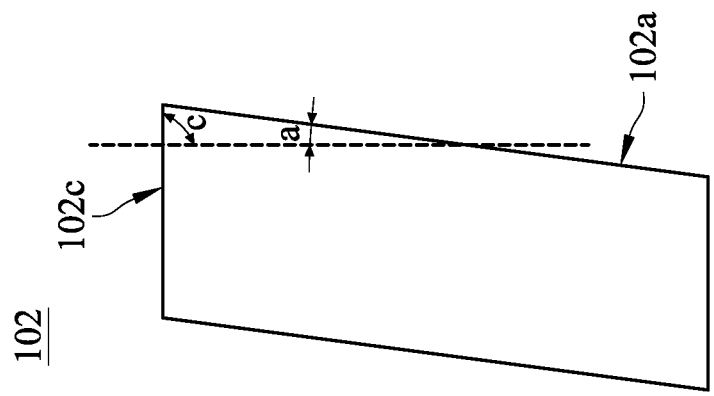
Figure 7:
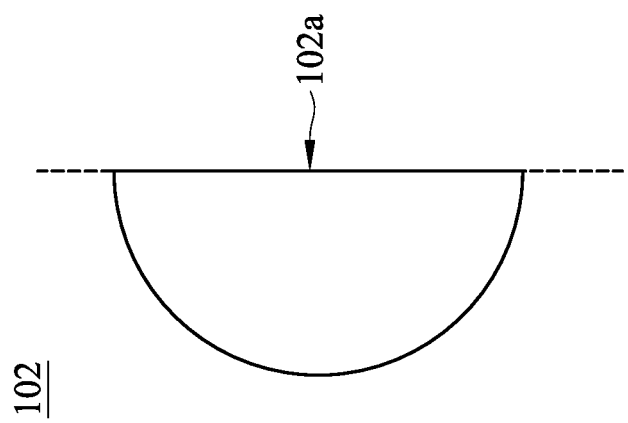
FIG. 7 is a schematic cross-sectional view of a truncated circular void according to an embodiment of the present disclosure.

Although FIG. 1 shows the void 102 as a triangular shape, the void 102 may be of other shapes. FIGS. 5A-5C are schematic cross-sectional views of triangular voids according to various embodiments of the present disclosure. FIGS. 6A-6C are schematic cross-sectional views of quadrilateral voids according to various embodiments of the present disclosure. FIG. 7 is a schematic cross-sectional view of a truncated circular void according to an embodiment of the present disclosure. As shown in FIGS. 5A to 5C, 6A to 6C and 7, a shape of a thickness section (perpendicular to the outer surface (e.g., the outer surface 10a of FIG. 1)) of the void 102 disposed inside the main body is a triangle, a quadrilateral or a truncated circle. In some embodiments, an inner angle a between the surface 102a of the void 102 facing the outer surface and the cross section (i.e. the dotted line) parallel to the outer surface is in a range of between 0° and 35°. In some embodiments, an inner angle c between another surface 102c of the void 102 connected to the surface 102a and the cross section (i.e., the dotted line) parallel to the outer surface is greater than or equal to 90°. In some embodiments, the inner angle c is greater than 90°.

Figure 8:
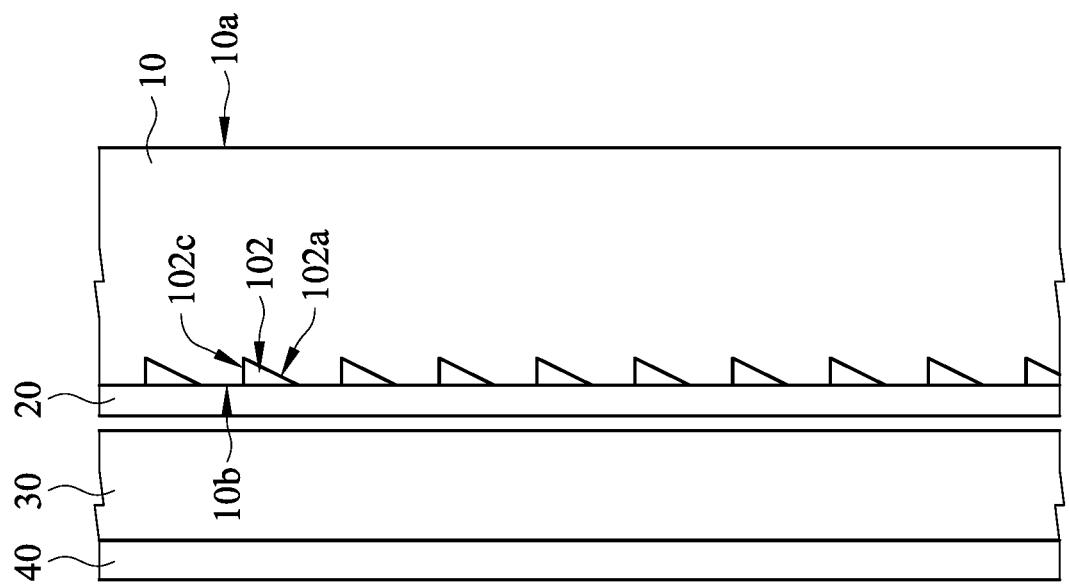
FIG. 8 is a schematic cross-sectional view of a sun protection device according to an embodiment of the present disclosure.

FIG. 8 is a schematic cross-sectional view of a sun protection device according to an embodiment of the present disclosure. The difference between FIG. 8 and FIG. 1 is that a plurality of voids 102 are disposed on the inner surface 10b of the main body 10, and one of the voids 102 has a surface 102a facing an outer surface 10a and another surface 102c, and the other surface 102c is connected between the surface 102a and the inner surface 10b. The function of the void 102 is the same as the above, and has effects of increasing reflectivity and reducing thermal energy conducted to the electronic element 40, thereby effectively preventing failure of the electronic element 40 from increasing in temperature due to accumulation of the thermal energy. In addition, the provision of the void 102 on the inner surface 10b also helps to reduce the thermal energy conducted from the inner surface 10b of the main body 10 to the S-type polarizer 20.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. A sun protection device, comprising:
   a main body, having an outer surface and an inner surface opposite to each other, and the outer surface being configured to face sunlight, and the main body having a plurality of voids disposed inside the main body, on the inner surface of the main body or a combination thereof, wherein when the sunlight irradiates the outer surface of the main body, a first reflected light and a first refracted light are formed, and the first refracted light enters the main body, and when the first refracted light arrives at a surface of one of the voids facing the outer surface, a second reflected light is formed; and
   an S-type polarizer adjacent to the inner surface of the main body.

2. The sun protection device of claim 1, wherein the surface of the one of the voids facing the outer surface is configured to maintain or increase an incident angle of the first refracted light.

3. The sun protection device of claim 1, wherein the surface of the one of the voids facing the outer surface is configured to make an incident angle of the first refracted light greater than or equal to a Brewster's angle or a critical angle calculated from a refractive index of the main body and a refractive index of the void.

4. The sun protection device of claim 1, wherein the one of the voids is disposed inside the main body, and a shape of a thickness section of the one of the voids perpendicular to the outer surface is a triangle, a quadrilateral or a truncated circle.

5. The sun protection device of claim 1, wherein the one of the voids is disposed on the inner surface of the main body, and has the surface facing the outer surface and another surface, and the other surface is connected between the surface and the inner surface.

6. The sun protection device of claim 1, wherein the sun protection device is positioned upright.

7. The sun protection device of claim 1, wherein the main body is made of polycarbonate (PC) or poly(methyl methacrylate) (PMMA).

8. The sun protection device of claim 1, wherein an inner angle between the surface of the one of the voids facing the outer surface and a cross-section parallel to the outer surface is in a range of between 0° and 35°.

9. The sun protection device of claim 8, wherein an inner angle between another surface of the one of the voids connected to the surface and the cross-section parallel to the outer surface is greater than or equal to 90°.

10. The sun protection device of claim 1, further comprising:
    a thermal insulation material layer, adjacent to the S-type polarizer, and the S-type polarizer being interposed between the main body and the thermal insulation material layer.

11. The sun protection device of claim 10, wherein the S-type polarizer and the thermal insulation material layer are separated from each other.

* * * * *